United States Patent
Miles (10) Patent No.: US 10,363,980 B2
(45) Date of Patent: Jul. 30, 2019

(54) BICYCLE CONTROLLING DEVICE

(71) Applicant: TIEN HSIN INDUSTRIES CO., LTD., Taichung (TW)

(72) Inventor: Jason Miles, Taichung (TW)

(73) Assignee: TIEN HSIN INDUSTRIES CO., LTD., Taichung (TW)

(*) Notice: Subject to any disclaimer, the term of this patent is extended or adjusted under 35 U.S.C. 154(b) by 252 days.

(21) Appl. No.: 15/628,548

(22) Filed: Jun. 20, 2017

(65) Prior Publication Data

US 2018/0362106 A1    Dec. 20, 2018

(51) Int. Cl.
| | |
|---|---|
| *B62M 6/45* | (2010.01) |
| *B62J 1/08* | (2006.01) |
| *B62M 25/08* | (2006.01) |
| *B62M 9/122* | (2010.01) |
| *B60L 1/00* | (2006.01) |
| *B62M 6/90* | (2010.01) |
| *B62K 19/36* | (2006.01) |
| *B62K 23/06* | (2006.01) |

(52) U.S. Cl.
CPC ............ *B62J 1/08* (2013.01); *B60L 1/003* (2013.01); *B62K 19/36* (2013.01); *B62K 23/06* (2013.01); *B62M 6/90* (2013.01); *B62M 9/122* (2013.01); *B62M 25/08* (2013.01); *B60L 2200/12* (2013.01); *B62J 2001/085* (2013.01)

(58) Field of Classification Search
CPC ....... B62J 1/08; B62J 2001/085; B62K 19/36; B62M 25/08; B62M 9/122; B60L 2200/12
See application file for complete search history.

(56) References Cited

U.S. PATENT DOCUMENTS

| | | | | |
|---|---|---|---|---|
| 10,137,964 B2* | 11/2018 | Kurokawa | ............ | B62K 23/00 |
| 2009/0101059 A1* | 4/2009 | Liu | ............ | B62J 6/003 |
| | | | | 116/202 |
| 2012/0253601 A1* | 10/2012 | Ichida | ............ | B60L 58/13 |
| | | | | 701/37 |

(Continued)

FOREIGN PATENT DOCUMENTS

TW    I562923 B    12/2016

OTHER PUBLICATIONS

English abstract for TWI562923, Total of 1 page.

*Primary Examiner* — Tony H Winner
(74) *Attorney, Agent, or Firm* — Lynette Wylie; Apex Juris, pllc.

(57) ABSTRACT

A bicycle controlling device including a lifting controller, a shifting controller, a height adjusting assembly, an electric rear derailleur and a seat height controller is disclosed. The lifting controller and the shifting controller are respectively adapted to generate and emit a lifting control signal or a shifting control signal. The height adjusting assembly is positioned in the seat tube and can be controllably lifted or fixed at a height. The seat height controller is fixed to the seat tube, and includes a wireless signal receiver, a control circuit and a motor. The wireless signal receiver is adapted to receive/transmit the lifting/shifting control signal to the control circuit, which is electrically connected with the electric rear derailleur and the motor, and controls the motor/the electric rear derailleur with the received lifting/shifting control signal. The motor can mechanically control the lifting of the height adjusting assembly or fix its height.

10 Claims, 6 Drawing Sheets

(56) References Cited

U.S. PATENT DOCUMENTS

| | | | |
|---|---|---|---|
| 2013/0076295 A1* | 3/2013 | Tsai | B62M 6/85 320/101 |
| 2013/0307299 A1* | 11/2013 | Winefordner | B62J 1/08 297/215.13 |
| 2014/0287856 A1* | 9/2014 | Kuwayama | B62M 9/132 474/80 |
| 2016/0280299 A1* | 9/2016 | Hara | B62J 1/28 |
| 2016/0311499 A1* | 10/2016 | Kasai | B62M 25/08 |
| 2017/0247082 A1* | 8/2017 | Katsura | B62M 9/132 |
| 2017/0282986 A1* | 10/2017 | Jhou | B62J 1/08 |
| 2018/0194418 A1* | 7/2018 | Bowers | B62J 1/08 |
| 2018/0244345 A1* | 8/2018 | Yamaguchi | B62M 9/1244 |

\* cited by examiner

BICYCLE CONTROLLING DEVICE

BACKGROUND OF THE INVENTION

1. Technical Field

The present disclosure is related to a bicycle controlling device, and more particularly to a bicycle controlling device for riders to control a derailleur and a height adjusting assembly.

2. Description of Related Art

In recent years, bicycle riding has become popular again in view of people's awareness of environmental protection and Government's implementation on energy conservation and carbon emission reduction. To increase bicycle riding's flexibility, convenience and practicality, bicycle manufacturers have developed related equipment of electric shifting control and real-time saddle lifting for the riders to install on their bicycles. Therefore, the riders can control the related equipment with their hands directly, and can achieve the purpose of changing speed and adjusting the saddle's height precisely and quickly.

Although the above equipment can achieve real-time adjustment, it still requires more improvement. For example, a conventional height adjusting assembly structure, as shown in Taiwanese Patent Number TW 1562923, titled "Bicycle Height adjusting assembly Structure", utilizes a lever on the grip to pull the cable, and then utilizes the cable path to turn on/off the lifting mechanism and control the height of the seat tube. However, since the above cable extended from the lever to the lifting structure of the seat tube is too long, the kinetic transmission may be affected. Long term stretching of the cable may also result in slow and imprecise operation of the lifting mechanism, and a resulting malfunction may cause unsafe conditions.

In common designs of the commercial electric derailleurs, the signal receiver and the controller are usually positioned in the housing of the front derailleur. An operation of the rear derailleur is controlled by the front derailleur after the signal receiver positioned inside of the front derailleur receiving the signal. However, for some bicycles, such as mountain bikes, which include only one chain ring and do not require the front shifting function, the front derailleur is nonetheless installed for controlling the rear derailleur. This design does not only increase the loading on the bicycle, but also increases the likelihood of additional maintenance cost.

Based on the above, it could be understood that there remains a persisting need to address such and other disadvantages and drawbacks in conventional height adjusting assemblies and electronic derailleurs control designs.

BRIEF SUMMARY OF THE INVENTION

In view of the above, the purpose of the present disclosure is to provide a bicycle controlling device which not only improves the above drawbacks, but also integrates the control methods of the rear derailleur and the saddle lifter to provide riding flexibility, convenience and practicality for the bicycle riders.

The present disclosure provides a bicycle controlling device adapted to be positioned on a frame of a bicycle. The basic structure of the bicycle is described as follows. The frame includes a seat tube, a top tube, a down tube, a seat stay, and a chain stay. One end of the down tube is connected to a lower section of the seat tube. The top tube is located at a front side of the seat tube in a forward direction of the bicycle. One end of the seat stay and one end of the chain stay are connected with each other, and the other ends of the seat stay and the chain stay are respectively connected to a top section and a lower section of the seat tube. The seat stay and the chain stay are positioned at a rear side of the seat tube in the forward direction of the bicycle. The bicycle further includes a front fork and a grip which the front fork is pivotally positioned on the frame, and the grip is fixed to the front fork.

The bicycle controlling device of the present disclosure includes a lifting controller, a shifting controller, a height adjusting assembly, an electric derailleur, and a seat height controller. Wherein, the lifting controller includes a lifting operation interface and a first wireless communication unit. The lifting operation interface is operated by a user to generate a lifting control signal which is to be emitted by the first wireless communication unit. The shifting controller is positioned on the grip, and includes a shifting operation interface and a second wireless communication unit which are electrically connected with each other. The shifting operation interface is operated by the user's hands to generate a shifting control signal which is to be emitted by the second wireless communication unit. The height adjusting assembly includes an outer tube and an inner tube. The inner tube is inserted into the outer tube, and part of the inner tube is protruded out of the outer tube. The height adjusting assembly further includes a switch, which can be switched between a first state and a second state. The inner tube can be moved corresponding to the outer tube at the first state, while the inner tube cannot be moved corresponding to the outer tube at the second state. The electric rear derailleur includes a movable portion, a chain shifter connected to the movable portion, and a first motor. The first motor is adapted to drive the movable portion to move the chain shifter between a plurality of positions. The seat height controller is fixed to the seat tube of the frame, and is close to a joint of the seat tube, the down tube and the chain stay. The seat height controller includes a wireless signal receiver, a control circuit, and a second motor. The wireless signal receiver is electrically connected with the control circuit and is adapted to receive and transmit a lifting control signal generated by the first wireless communication unit, or a shifting control signal generated by the second wireless communication unit to the control circuit. The control circuit is electrically connected with the first motor and the second motor. The control circuit is adapted to convert the received lifting control signal or the received shifting control signal into motor control signals so as to control the operation of the first motor and the second motor. Besides, the second motor is connected to the switch of the height adjusting assembly with a mechanically driving relation such that the switch can be switched between the first state and the second state.

By the above design, the operations of shifting control and seat lifting control can be integrated effectively. The flexibility, convenience, and practicality on bicycle riding can be increased.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
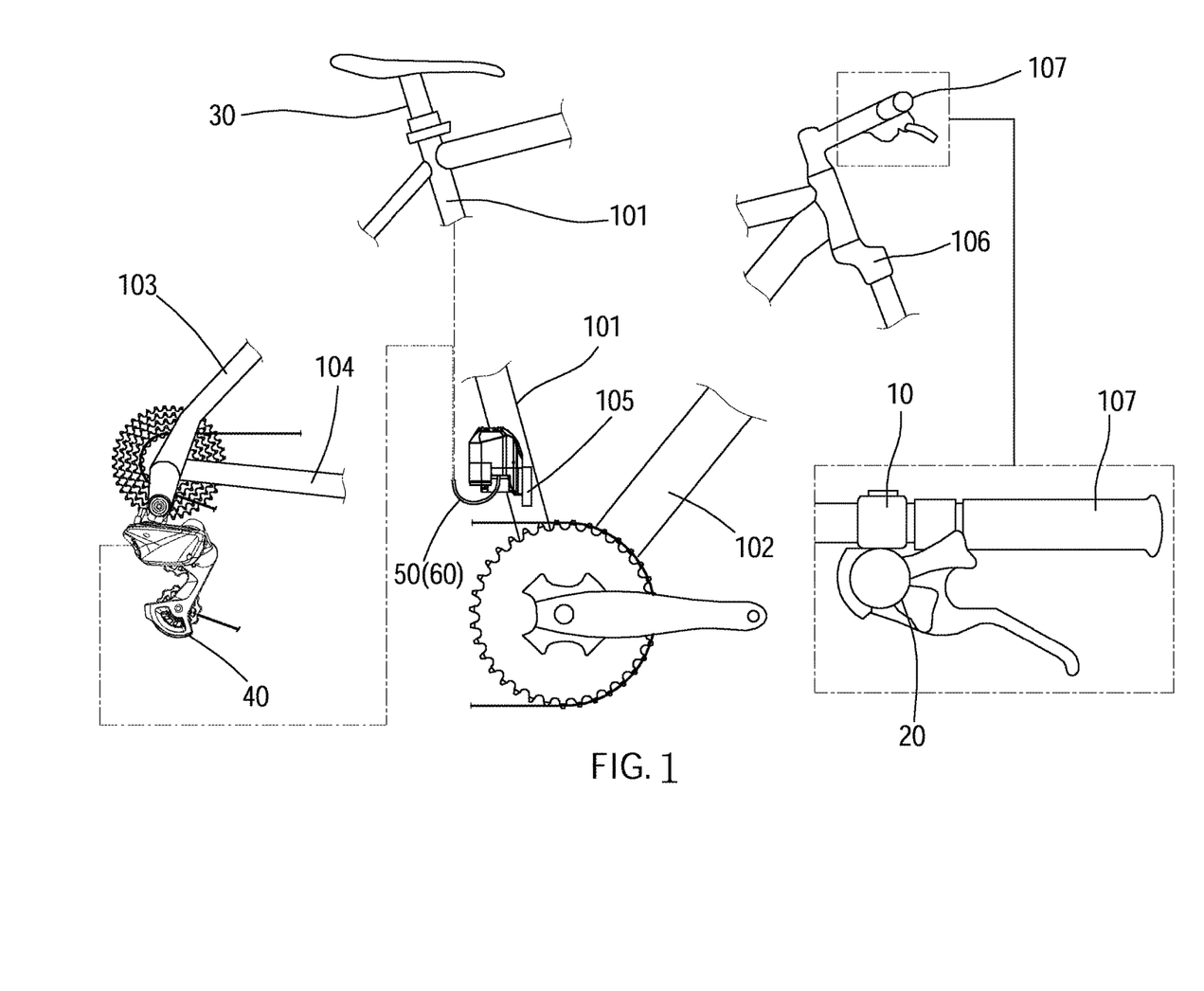
FIG. 1 is a perspective configuration view of a bicycle controlling device of an embodiment according to the present disclosure.

The following illustrative embodiments and drawings are provided to illustrate the present disclosure, these and other advantages and effects can be clearly understood by persons skilled in the art after reading the disclosure of this specification. As shown in FIG. 1, a bicycle controlling device of an embodiment according to the present disclosure is illustrated. The bicycle controlling device is positioned on a frame of a bicycle. The frame of the bicycle includes a seat tube 101, a top tube, a down tube 102, a seat stay 103 and a chain stay 104. In this embodiment, the frame having a top tube is illustrated as an example. However, in other embodiments, the top tube of the frame can be omitted.

One end of the down tube 102 is connected to a lower section of the seat tube 101. One end of the seat stay 103 and one end of the chain stay 104 are connected with each other, while the other ends thereof are respectively connected to a top section and a lower section of the seat tube 101. In a forward direction of the bicycle, the top tube is positioned at a front side of the seat tube 101, while the seat stay 103 and the chain stay 104 are positioned at the rear side of the seat tube 101. Besides, a mount 105 is protrudently positioned at a section of the seat tube 101, close to the joint of the seat tube 101 with the down tube 102 and the chain stay 104. In addition, the bicycle further includes a front fork 106 and a grip 107, wherein the front fork 106 is pivotally positioned at the front side of the frame, and can be pivoted left and right respect to the frame. The grip 107 is fixed to the front fork 106 and can be turned together with the front fork 106. In this embodiment, the chain wheel of the bicycle includes one single chain ring.

The bicycle controlling device includes a lifting controller 10, a shifting controller 20, a height adjusting assembly 30, an electric rear derailleur 40, a seat height controller 50 and a power supply 60.

Figure 2:
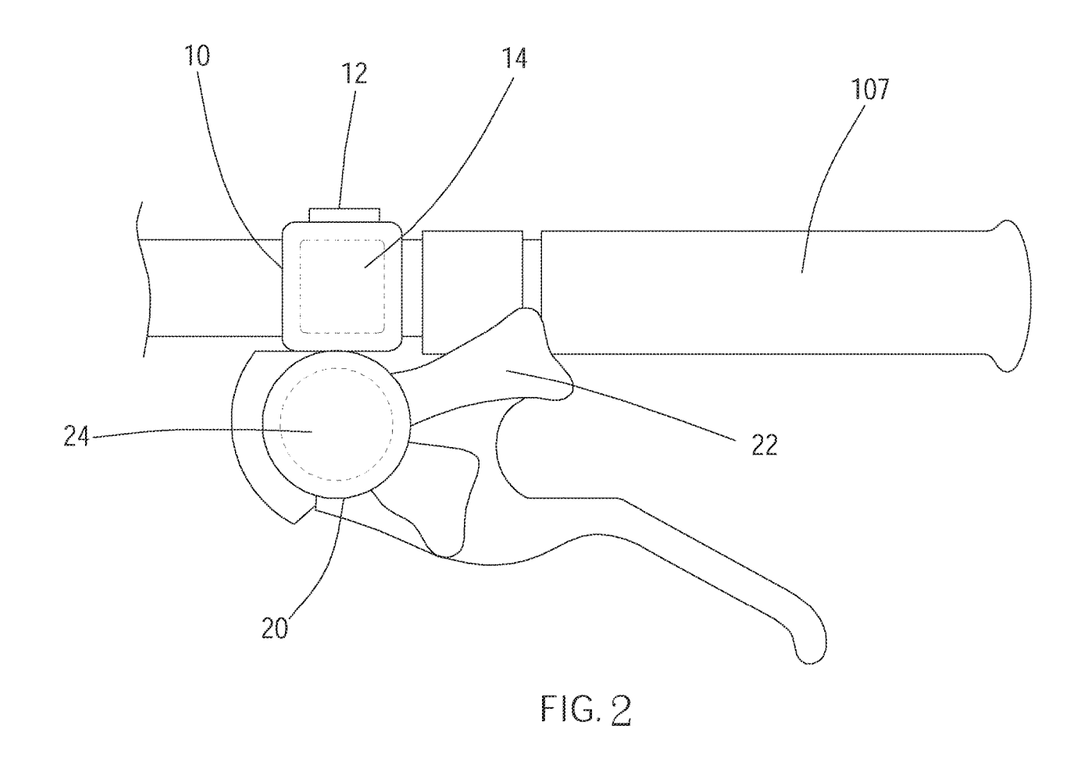
FIG. 2 is a perspective configuration view of the lifting controller and the shifting controller of the embodiment according to the present disclosure.

As shown in FIG. 2, the lifting controller 10 is positioned on the grip 107, and the lifting controller includes a lifting operation interface 12 and a first wireless communication unit 14. The lifting operation interface 12 is provided for a user to operate the lifting controller 10 to generate a lifting control signal. The lifting control signal 12 is emitted through the first wireless communication unit 14. In this embodiment, the lifting operation interface 12 is a switch with self-reset function that is normally open. That is, when the user presses the lifting operation interface 12, the switch will be turned on and generate a lifting control signal. The lifting control signal will be emitted by the first wireless communication unit 14. On the contrary, when the user stops pressing and leaves the lifting operation interface, the switch will turn off automatically and will not generate lifting control signals anymore. It shall be noted here that in addition to installing the lifting controller 10 on the grip 107 for operation by the user, the lifting controller 10 can also be installed on the front fork, an arbitrary position of the frame or user's personal equipment, such as gloves, so as to generate the lifting control signals according to the requirement of user. Besides, in addition to the switch with self-reset function mentioned above, other types of switches, such as a micro switch or a proximity switch, also can be used to achieve the same purpose and the function.

As shown in FIG. 2, the shifting controller 20 is also positioned on the grip 107 and includes a shifting operation interface 22 and a second wireless communication unit 24. Wherein, the shifting operation interface 22 is operated by the user to generate a shifting control signal. The shifting control signal is emitted through the second wireless communication unit 24. In this embodiment, the shifting operation interface 22 includes two switches with self-reset function which are normally open respectively corresponding to up-shifting and down-shifting. When the user presses the shifting operation interface 22, a corresponding one of the switches will be turned on and a shifting control signal for up-shifting or down-shifting will be generated. The up-shifting or down-shifting control signal will be emitted through the second wireless communication unit 24. In other embodiments, the shifting operation interface 22 can be a multi-stage switch. Each stage of the multi-stage switch corresponds to a different shifting gear. That is, when the user changes the shifting operation interface 22, one stage of the switch corresponding to the shifting gear will be turned on and the shifting control signal is generated and then emitted through the second wireless communication unit 24. The same result is achieved.

Figure 3:
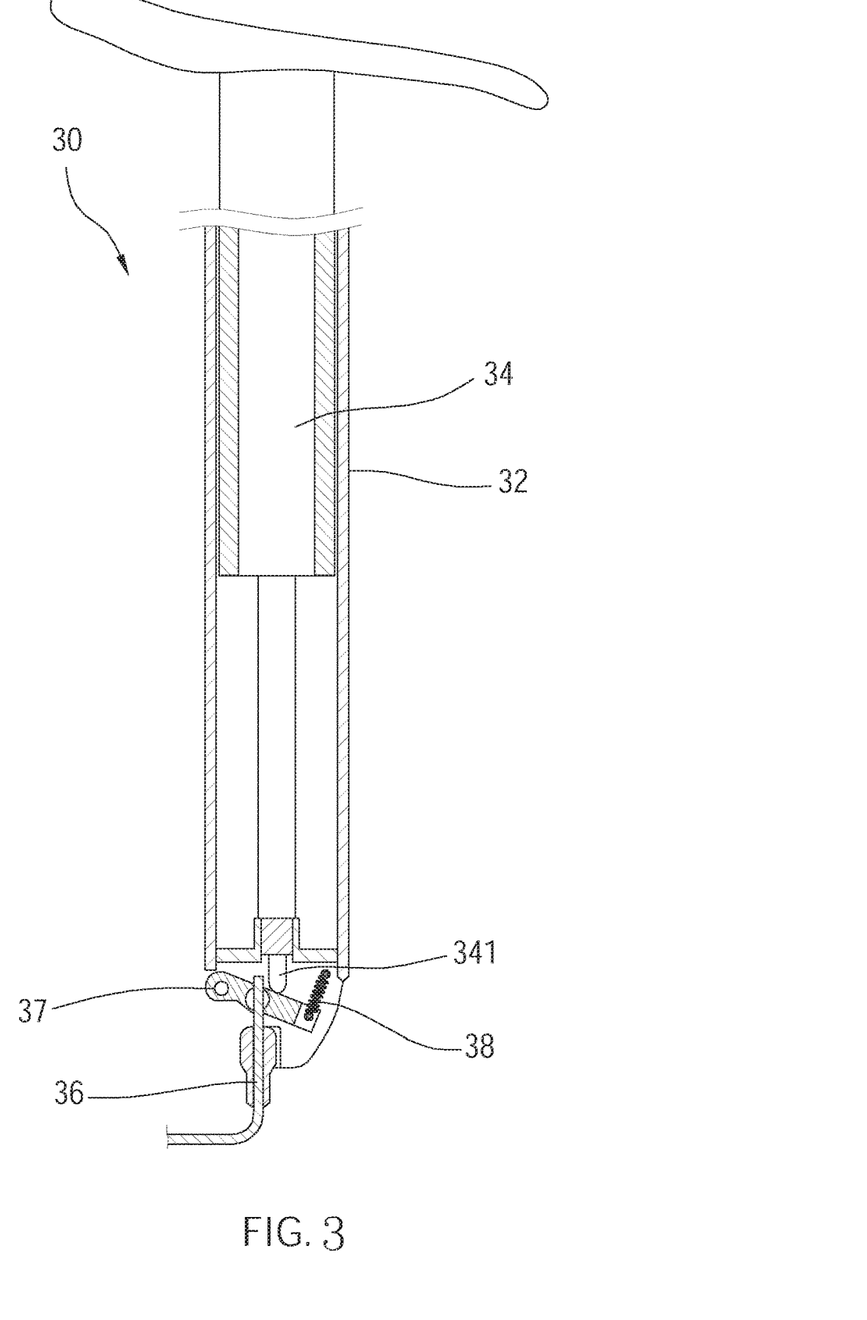
FIG. 3 is a perspective view of the height adjusting assembly of the embodiment according to the present disclosure.

In this embodiment, the height adjusting assembly 30 includes an outer tube 32 and an inner tube 34. Wherein, the outer tube 32 is positioned inside of the seat tube 101 and part of the outer tube 32 is positioned outside of the seat tube 101. The inner tube 34 is inserted into the outer tube 32, and part of the inner tube 34 is protruded out of the outer tube 32 for connecting with the saddle. The inner tube 34 includes a pneumatic spindle formed therein such that the inner tube 34 can be extended or withdrew in the outer tube 32 for adjusting the height of the saddle. For controlling, the inner tube 34 includes a switch 341 protrudes from the bottom of the outer tube 32 as a pneumatic valve of the pneumatic spindle. The switch 341 can be switched between a first state and a second state. When the switch 341 is at the first state, the pneumatic spindle of the inner tube 34 will be active, and the inner tube 34 can be moved to extend or withdraw with respect to the outer tube 32. On the contrary, when the switch 341 is at the second state, the pneumatic spindle of the inner tube 34 will be locked, and the inner tube 34 cannot be moved accordingly. In the structure of this embodiment, the first state refers to a state that the switch 341 is being pressed, while the second state refers to a state that the switch 341 is not being pressed. The detailed structure for utilizing the switch 341 to extend or withdraw the inner tube 34 is related to conventional arts and is omitted here. Besides, in addition to the height adjusting assembly 30 which is lifted or lowered by the pneumatic spindle, the present disclosure also can be equipped with other types of commercialized height adjusting assemblies. However, the other types of commercialized height adjusting assemblies are also not apart from the concept of the structure mentioned above which includes an inner tube, an outer tube and controlling via a switch.

Figure 4:
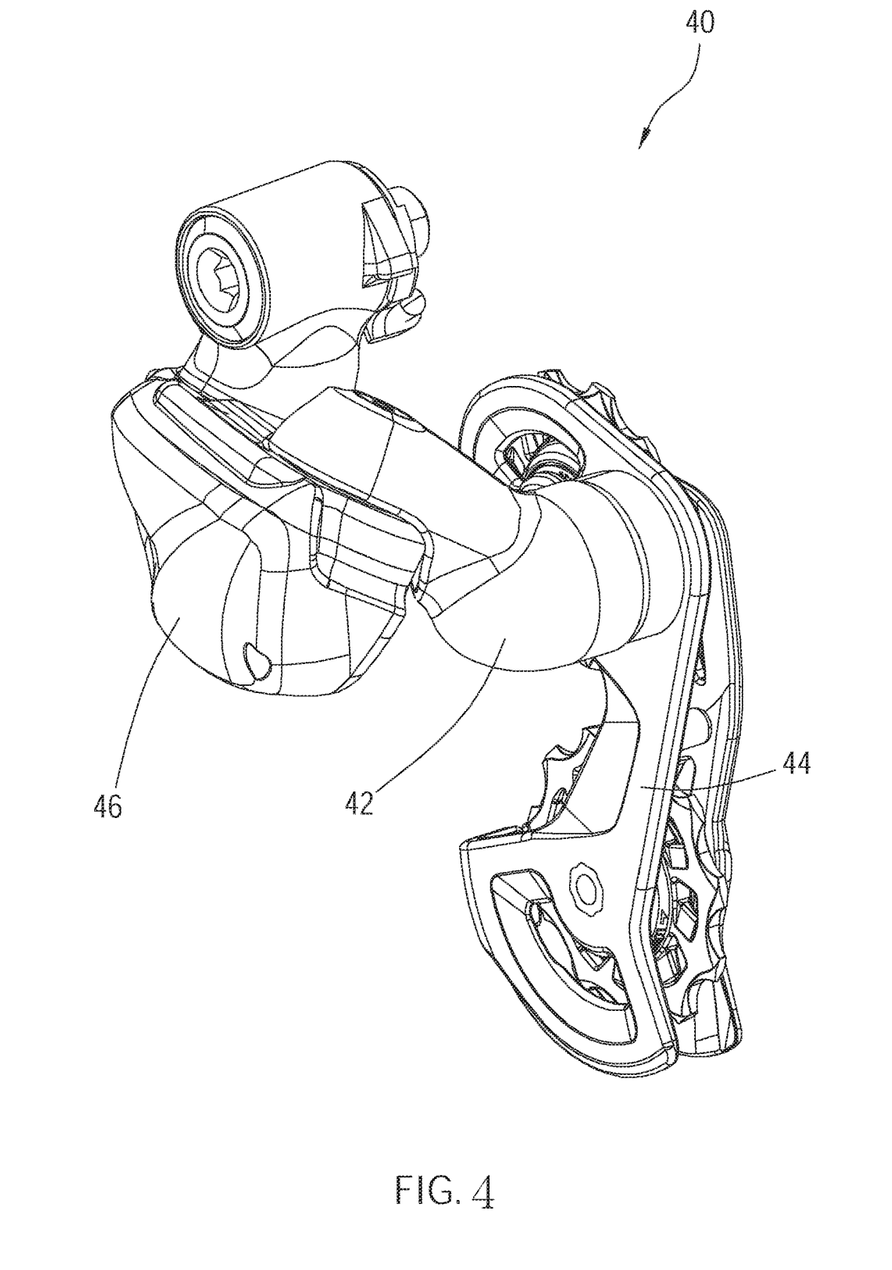
FIG. 4 is a perspective view of the electric rear derailleur of the embodiment according to the present disclosure.

As shown in FIG. 4, the electric rear derailleur 40 is fixed to the frame and is located at the joint of the seat stay 103 and the chain stay 104. The electric rear derailleur 40 includes a movable portion 42, a chain shifter 44 connected to the movable portion 42, and a first motor 46. Wherein, when the first motor 46 rotates, it will drive the movable portion 42 to move the chain shifter 44 between several positions and achieve the shifting purpose.

Figure 5:
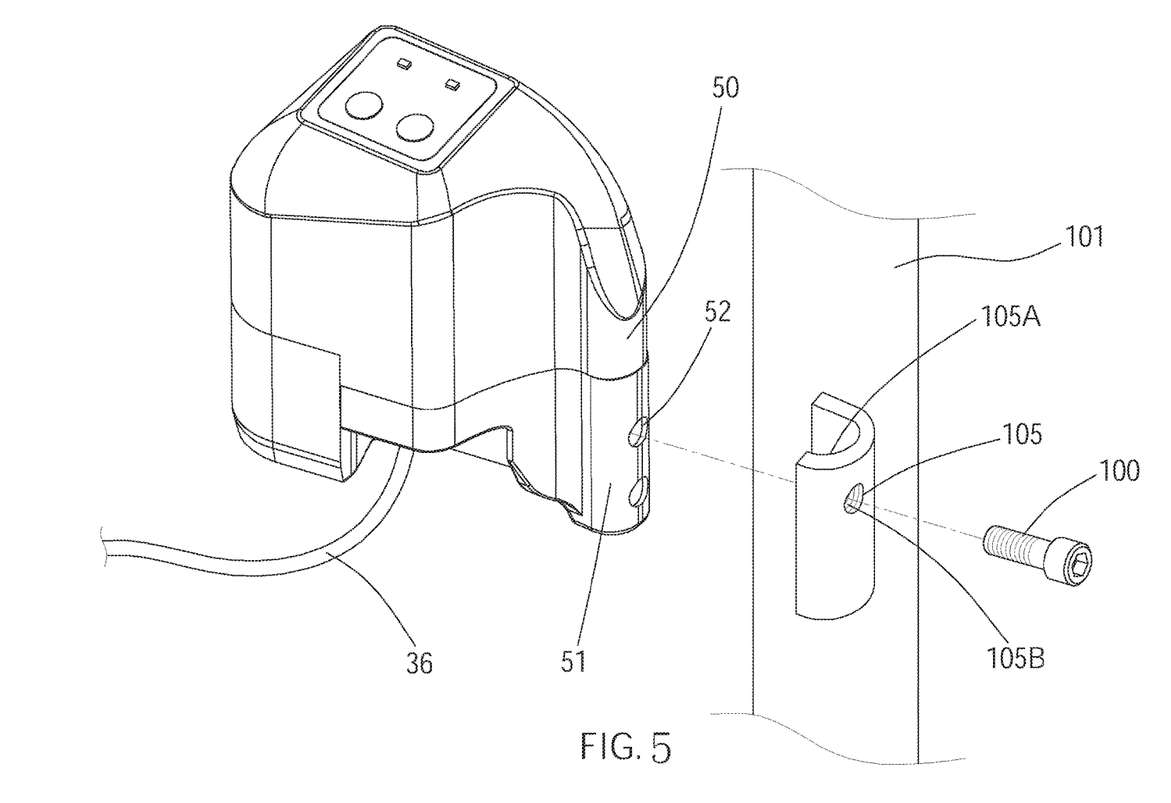
FIG. 5 is a perspective view of the seat height controller and the mount of the embodiment according to the present disclosure.

The seat height controller 50 is fixed to the mount 105 of the seat tube 101. As shown in FIG. 5, in this embodiment, the mount 105 includes a socket 105A, and a through hole 105B. The housing of the seat height controller 50 is formed with a projection 51 corresponding to the socket 105A. The shapes of the projection 51 and the socket 105A are complementary, and the projection 51 is formed with two screw holes 52 arranged up and down. When the projection 51 and the socket 105A abut on each other, one of the screw holes 52 will be aligned with the through hole 105B on the socket 105A. Then, a bolt 100 can be threaded into the screw hole 52 by passing through the through hole 105B. Whereby, the seat height controller 50 can be fixed to the seat tube 101. More detail, by the structure design of the above socket 105A and the projection 51, not only the seat height controller 50 can be quickly arranged to the mount 50, but the arc-shaped design also can help the user to adjust a positioning angle of the seat height controller 50 according to the user's requirement. Besides, the two screw holes 52 are designed to provide the user an option to use either one of them according to a size of the frame, a size of the chain wheel or other design requirements. Whereby, the flexibility of installing the seat height controller 50 is increased. In addition to utilizing the bolt-fixing method, a clamp, a buckle or other types of detachable fixing methods also can be used to secure the seat height controller 50.

It shall be noted here that the chain wheel of this embodiment includes a single chain ring. By such as design, it is unnecessary to set up a front derailleur, such that the seat height controller 50 can be fixed to the position originally equipped with the front derailleur. Therefore, a loading of the frame can be decreased, and a maintenance fee thereof can be reduced.

Figure 6:
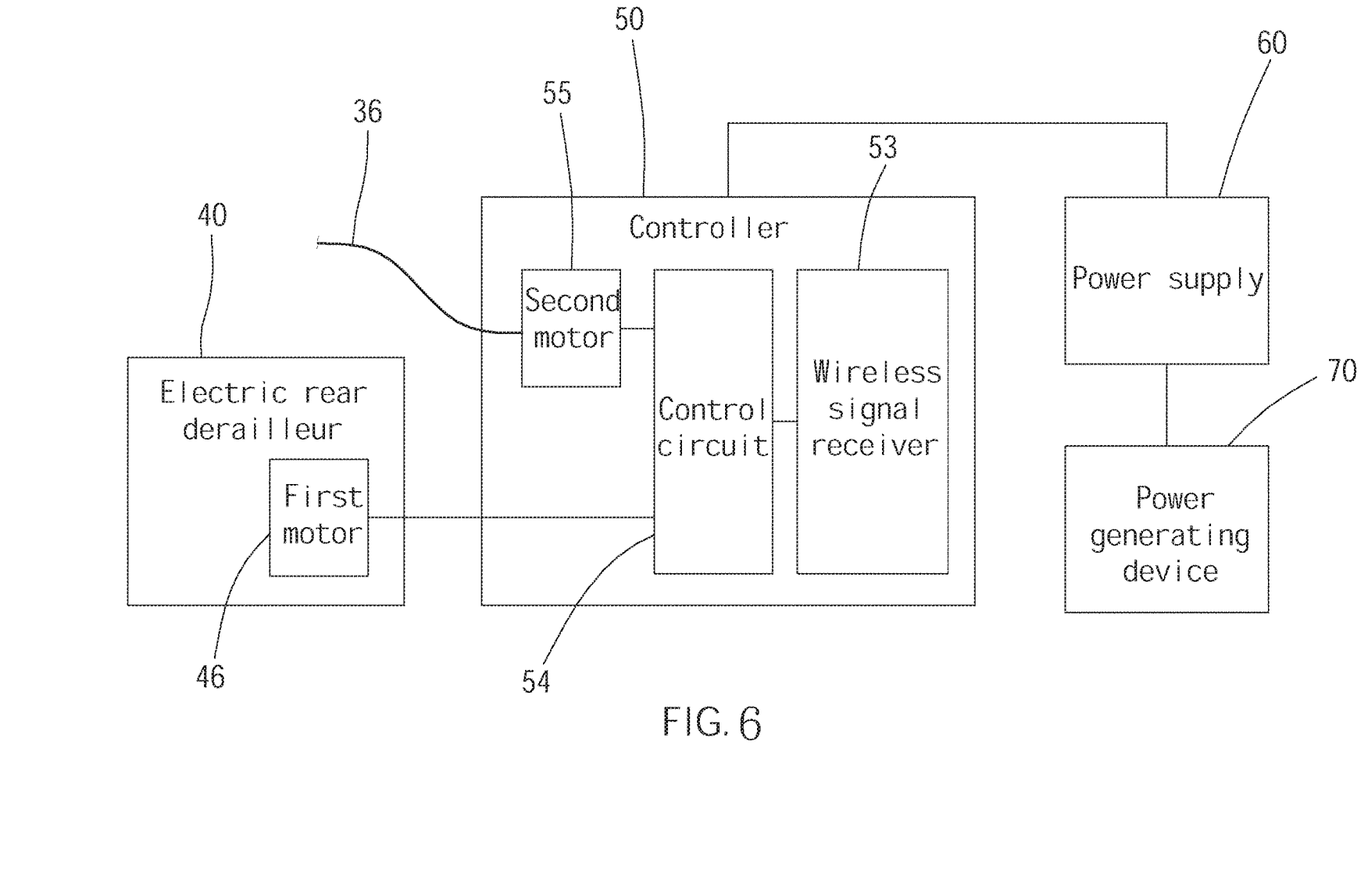
FIG. 6 is a block diagram of the electric rear derailleur, the seat height controller, the power supply and the power generating device of the embodiment according to the present disclosure.

As shown in FIG. 6, the seat height controller 50 includes a wireless signal receiver 53, a control circuit 54 and a second motor 55. Wherein, the wireless signal receiver 53 is electrically connected with the control circuit 54 and is used for receiving and transmitting the control signals such as the lifting control signals emitted by the first wireless communication unit 14 or the shifting control signals emitted by the second wireless communication unit 24 to the control circuit 54. The control circuit 54 is electrically connected with the first motor 46 and the second motor 55, is used for converting the received lifting control signals or the received shifting control signals into motor control signals so as to control the operations of the first motor 46 and the second motor 55. In other words, the seat height controller 50 communicates with the lifting controller 10 and the shifting controller 20 via a wireless transmission method, while the seat height controller 50 communicates with the electric rear derailleur 40 via a wire transmission method through a cable EC. It shall be noted here that a design purpose of utilizing wireless transmission method between the seat height controller 50, the lifting controller 10 and the shifting controller 20 is to effectively minimize a disturbance resulted from arranging cables to bicycle riding. Meanwhile, the purpose of utilizing wire transmission between the seat height controller 50 and the electric rear derailleur 40 is to ensure that the motor control signals can be provided to the first motor 46 of the electric rear derailleur 40 stably. Whereby, wrong signals resulted from external disturbance can be prevented, and then malfunction with the wrong signals of the electric rear derailleur 40 would not be occurred.

Besides, the second motor 55 is connected to the switch 341 of the height adjusting assembly 30 with a mechanically driving relation. The mechanically driving relation can drive the switch 341 switches between the first state and the second state. More detail, as shown in FIG. 3 and FIG. 6, in this embodiment, a transmission cable 36 is connected to an export shaft of the second motor 55. In addition, a lever 37 is pivotally positioned at the bottom of the outer tube 32 of the height adjusting assembly 30, and the lever 37 can sway pivotally at the bottom of the outer tube 32. The lever 37 is connected with the transmission cable 36, while one end of the lever 37 is connected with the outer tube 32 via an elastic element 38. In this embodiment, the elastic element 38 is a spring, while in other embodiments, the elastic element 38 can be other elastic objects which can provide elastic force. Therefore, when the motor 55 operates to loosen the transmission cable 36, the lever 37 will be pulled by the elastic force of the elastic element 38 and then sway pivotally in counterclockwise direction to produce an upward pushing force. Afterwards, the switch 341 is pressed by the upward pushing force and switched to the first state. Moreover, when the motor operates to tighten the transmission cable 36 in a reverse direction, the lever 37 will be pulled by the transmission cable 36 and be apart from the switch 341. The switch 341 is not pressed by the lever 37 anymore and is reset to the second state. In addition to the above mechanically driving design between the transmission cable 36 and the lever 37, other types of mechanical structures which can control the switch, also can be replaced as a gear set, a multi-link, or a structure which can providing a restore force with other types of elastic elements by a switch with a direct-pulling cable, etc.

Therefore, by positioning the seat height controller 50 on the seat tube 101 to replace the front derailleur, not only the loading can be decreased and but also the maintenance fee can be reduced. Besides, a distance between the seat height controller 50 and the height adjusting assembly 30, that is, a length between the seat height controller 50 and the height adjusting assembly 30, can also be shortened effectively. Whereby, the mechanically driving efficiency between the seat height controller 50 and the height adjusting assembly 30 can be increased and further avoiding imprecise or slow operation due to too long cables and malfunctions. Moreover, in other embodiments that include a chain wheel with multiple chain rings, though the seat height controller 50 cannot be installed at the original position of the front derailleur, it can be installed at the opposite side of the original position of the front derailleur or at other portions of the seat tube 101 to achieve the same effect.

The power supply 60 is electrically connected with the seat height controller 50, and is used to supply electric power for the operation of the seat height controller 50. In this embodiment, the power supply 60 is a lithium battery and it is detachably integrated into the seat tube control 50 for providing electricity. This design can not only significantly reduce the electricity transmission path, so as to greatly reduce electricity loss, but also avoid the obstruction results from long electricity transmission cables while riding a bicycle. In addition to integrate the power supply 60 into the seat height controller 50, the power supply 60 can be independently installed on other portions of the frame, such as the seat tube 101, or the down tube 102, or can be positioned in the height adjusting assembly 30, the seat tube 101, or the front fork 106 or the grip 107 to supply the electricity depending on the requirements in practice.

It shall be noted that, in the present disclosure, a power generating device 70 can also be added and electrically connected to the above mentioned power supply 60 to store the generated electricity to the power supply 60, as shown in FIG. 6. In practice, the power generating device 70 can be power generators that can be loaded on the bicycle, such as a solar panel for converting solar energy into electricity, a rear flywheel power generator for converting riding kinetic energy into electricity, or a chain wheel power generator.

By the above design, it can significantly improve the drawbacks of power transmission interference by long cable and the malfunction resulted therefrom. Meanwhile, it can also reduce the loading and the maintenance cost of the bicycle, and also increase the riding flexibility, convenience, and practicality for the riders.

It must be pointed out that the embodiments described above are only some embodiments of the present disclosure. All equivalent structures which employ the concepts disclosed in this specification and the appended claims should fall within the scope of the present disclosure.

What is claimed is:

1. A bicycle controlling device, comprising:
   a height adjusting assembly, comprising an outer tube, an inner tube and a switch, wherein the inner tube is inserted into the outer tube; the switch can be switched between a first state and a second state; the inner tube is movably correspond to the outer tube at the first state, while the inner tube is not movably correspond to the outer tube at the second state;
   a lifting controller, comprising a lifting operation interface and a first wireless communication unit, wherein the lifting operation interface is operated by a user to generate a lifting control signal, and the lifting control signal is emitted by the first wireless communication unit;
   a shifting controller, comprising a shifting operation interface and a second wireless communication unit, wherein the shifting operation interface is operated by the user to generate a shifting control signal, and the shifting control signal is emitted by the second wireless communication unit;
   an electric rear derailleur, comprising a movable portion, a chain shifter connected to the movable portion, and a first motor, wherein the first motor is adapted to drive the movable portion to move the chain shifter between a plurality of positions; and
   a seat height controller, comprising a wireless signal receiver, a control circuit, and a second motor; wherein the second motor is connected to the switch of the height adjusting assembly with a mechanical driving relation which drives the switch to adjust between the first state and the second state;
   wherein, the wireless signal receiver is electrically connected to the control circuit, and the control circuit is electrically connected with the first motor and the second motor; and the control circuit is adapted to receive and transmit a control signal generated by the first wireless communication unit or the second wireless communication unit, and correspondingly control an operation of the first motor or the second motor.

2. A bicycle controlling device of claim 1, is positioned on a frame of a bicycle, wherein the frame comprises a seat tube, a top tube, a down tube, a seat stay, and a chain stay; one end of the down tube is connected to a lower section of the seat tube; the top tube is located at a front side of the seat tube in a forward direction of the bicycle; one end of the seat stay and one end of the chain stay are connected with each other, and the other ends of the seat stay and the chain stay are respectively connected to a top section and a lower section of the seat tube; the seat stay and the chain stay are positioned at a rear side of the seat tube in the forward direction of the bicycle; and the bicycle further includes a front fork and a grip, the front fork is pivotally positioned on the frame, and the grip is fixed to the front fork; the bicycle controlling device is characterized in that:
   the seat height controller is detachably positioned on the seat tube, and is positioned close to a joint of the seat tube, the down tube and the chain stay.

3. The bicycle controlling device of claim 2, wherein a mount comprises a through hole and is protrudently positioned at a section of the seat tube, close to the joint of the seat tube, the down tube, and the chain stay; the seat height controller comprises a screw hole and is positioned corresponding to the through hole; and a bolt can be threaded into the screw hole by passing through the through hole, and the seat height controller can be fixed to the seat tube of the frame.

4. The bicycle controlling device of claim 3, wherein the mount comprises a socket, and the through hole is positioned on the socket; the seat height controller comprises a projection; the projection and the socket are abutting on each other with complementary shapes; and the screw hole is positioned on the projection of the seat height controller.

5. The bicycle controlling device of claim 2, wherein a mount is protrudently positioned at a section of the seat tube, close to the joint of the seat tube, the down tube, and the chain stay; the mount comprises a socket; the seat height controller comprises a projection;
   wherein the projection and the socket are abutting on each other with complementary shapes.

6. The bicycle controlling device of claim 2, wherein the lifting controller is positioned on the grip, the front fork, or the frame.

7. The bicycle controlling device of claim 1, further comprising a power supply electrically connected with the seat height controller, and the power supply is adapted to provide electric power for the seat height controller to transmit motor control signals to the first motor and the second motor.

8. The bicycle controlling device of claim 7, wherein the power supply is positioned on the front fork, the height adjusting assembly, the grip, the frame, the seat tube, or inside the seat height controller.

9. The bicycle controlling device of claim 7, further comprising a power generating device electrically connected with the power supply, and the power generating device is adapted to generate and store electricity to the power supply.

10. The bicycle controlling device of claim 1, wherein the second motor is mechanically connected with the switch of the height adjusting assembly via a cable, and the second motor drives the switch of the height adjusting assembly to adjust between the first state and the second state with the cable.

* * * * *